(12) United States Patent
Mundra et al.

(10) Patent No.: US 12,625,638 B1
(45) Date of Patent: May 12, 2026

(54) CAPACITY-BASED REPLICATION MANAGEMENT ACROSS DIFFERENT DATA SET DISTRIBUTIONS

(71) Applicant: Amazon Technologies, Inc., Seattle, WA (US)

(72) Inventors: Sagar Mundra, San Jose, CA (US); Carlos Humberto Hasan Valdovino, Seattle, WA (US); Sharatkumar Nagesh Kuppahally, Issaquah, WA (US); Somasundaram Perianayagam, Seattle, WA (US); Vinit Vikram Shah, Seattle, WA (US)

(73) Assignee: Amazon Technologies, Inc, Seattle, WA (US)

( * ) Notice: Subject to any disclaimer, the term of this patent is extended or adjusted under 35 U.S.C. 154(b) by 57 days.

(21) Appl. No.: 18/901,703

(22) Filed: Sep. 30, 2024

(51) Int. Cl.
*G06F 3/06* (2006.01)

(52) U.S. Cl.
CPC ............ *G06F 3/065* (2013.01); *G06F 3/0604* (2013.01); *G06F 3/0679* (2013.01)

(58) Field of Classification Search
CPC ....... G06F 3/065; G06F 3/0604; G06F 3/0679
See application file for complete search history.

(56) References Cited

U.S. PATENT DOCUMENTS

| | | | | |
|---|---|---|---|---|
| 8,364,636 | B2 * | 1/2013 | Newport ............... | G06F 16/275 |
| | | | | 707/637 |
| 9,239,767 | B2 * | 1/2016 | Whynot ................ | G06F 16/273 |
| 10,102,230 | B1 | 10/2018 | Muniswamy Reddy et al. | |
| 10,146,814 | B1 | 12/2018 | Gupta et al. | |
| 10,268,726 | B1 | 4/2019 | Schiesser | |
| 10,635,650 | B1 | 4/2020 | Chud | |
| 10,678,813 | B2 * | 6/2020 | Bortnikov ............. | G06F 16/278 |
| 11,080,253 | B1 * | 8/2021 | Leshinsky ........... | G06F 16/2272 |
| 11,599,294 | B2 * | 3/2023 | Fouda ................... | G06F 16/176 |
| 11,803,568 | B1 * | 10/2023 | Jain ...................... | G06F 11/3409 |
| 11,966,387 | B2 | 4/2024 | Jiang et al. | |
| 12,105,692 | B1 * | 10/2024 | Kumar .................. | G06F 16/278 |
| 12,147,317 | B1 * | 11/2024 | Mohideen ........... | G06F 11/1471 |
| 2016/0210341 | A1 * | 7/2016 | Zhuang .................... | G06F 16/27 |
| 2020/0019505 | A1 * | 1/2020 | Shilane ................... | G06F 12/12 |
| 2020/0371952 | A1 * | 11/2020 | Ke ........................ | G06F 12/0246 |
| 2023/0010652 | A1 * | 1/2023 | Nelson .................... | G06F 16/27 |
| 2023/0394062 | A1 * | 12/2023 | Dong ...................... | G06F 16/27 |
| 2023/0409594 | A1 * | 12/2023 | Geiselhart ............. | G06F 16/275 |
| 2024/0419344 | A1 * | 12/2024 | Goodman ............. | G06F 3/0631 |

\* cited by examiner

*Primary Examiner* — Jorge A Casanova
(74) *Attorney, Agent, or Firm* — S. Scott Foster; Kowert, Hood, Munyon, Rankin & Goetzel, P.C.

(57) ABSTRACT

An update performed to a first data set may be replicated to a second data set, where the first and second data sets may be organized according to different schemas. The replication of the update may comprise determining that a set-wide replication capacity for replicating across the second data set may suffice to perform the replication, as well as a store-specific replication capacity for replicating to an identified data store of the second data set. Based on a determination that the set-wide replication capacity and the store-specific replication capacity may suffice for replicating the update, the update may be caused to be replicated on the second data set.

20 Claims, 9 Drawing Sheets

700

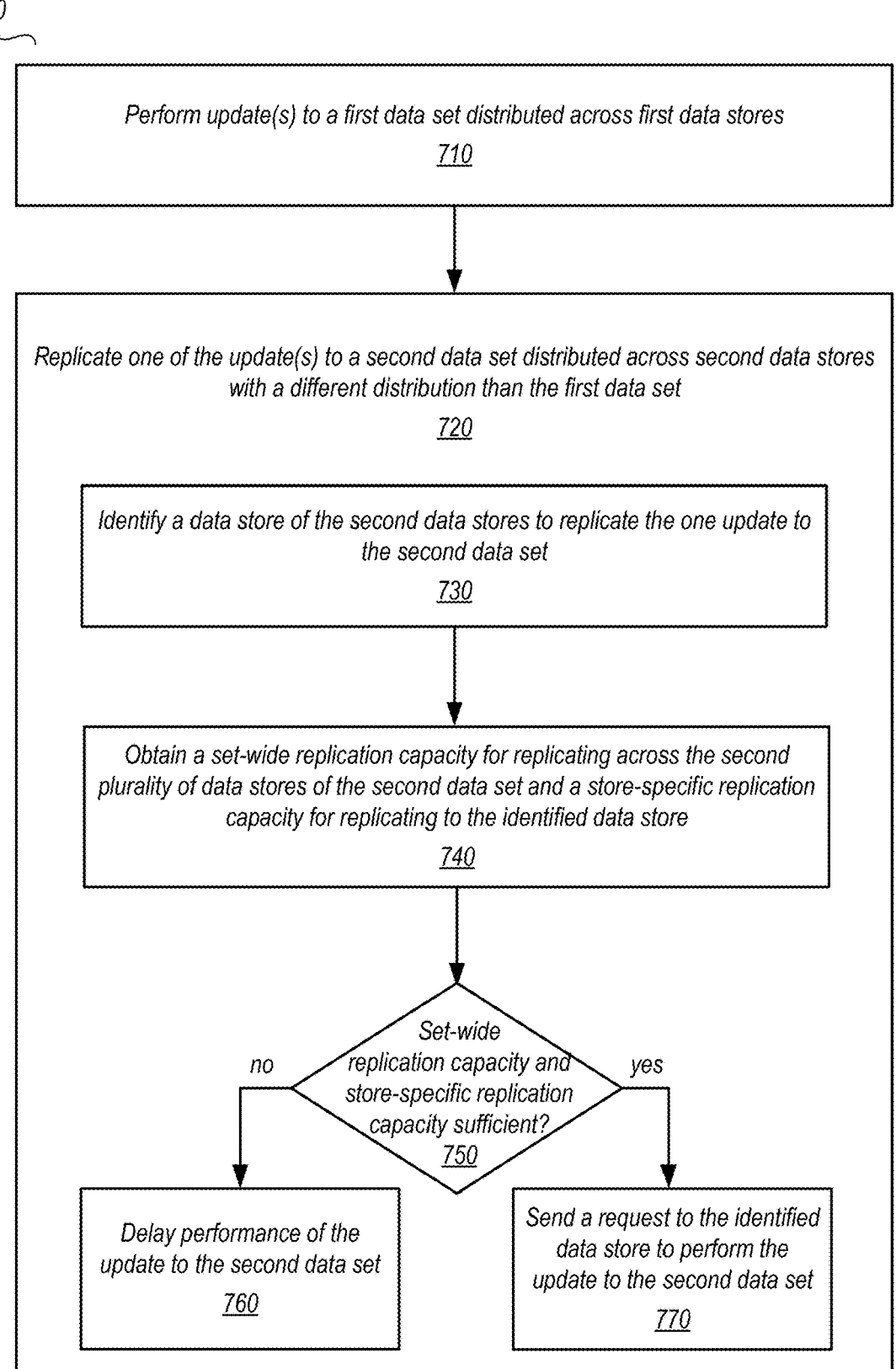

Perform update(s) to a first data set distributed across first data stores
710

Replicate one of the update(s) to a second data set distributed across second data stores with a different distribution than the first data set
720

Identify a data store of the second data stores to replicate the one update to the second data set
730

Obtain a set-wide replication capacity for replicating across the second plurality of data stores of the second data set and a store-specific replication capacity for replicating to the identified data store
740

Set-wide replication capacity and store-specific replication capacity sufficient?
750 no yes

Delay performance of the update to the second data set
760

Send a request to the identified data store to perform the update to the second data set
770

*FIG. 7*

CAPACITY-BASED REPLICATION MANAGEMENT ACROSS DIFFERENT DATA SET DISTRIBUTIONS

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. However, replicating different portions of the partitioned data can further increase the complexity and costs of propagating changes to the data to other data replicas. For example, projections or views of a partitioned database table may be separately maintained. Propagating changes to the projection or views may increase the costs of processing updates at the original partitions of the database table as the original partitions of the database table may need to ensure that the appropriate projections or views of the database table are updated.

BRIEF DESCRIPTION OF THE DRAWINGS

FIG. 7 is a high-level flowchart illustrating various methods and techniques to implement capacity-based replication management for replicating changes across data set distributions, according to some embodiments.

Figure 1:
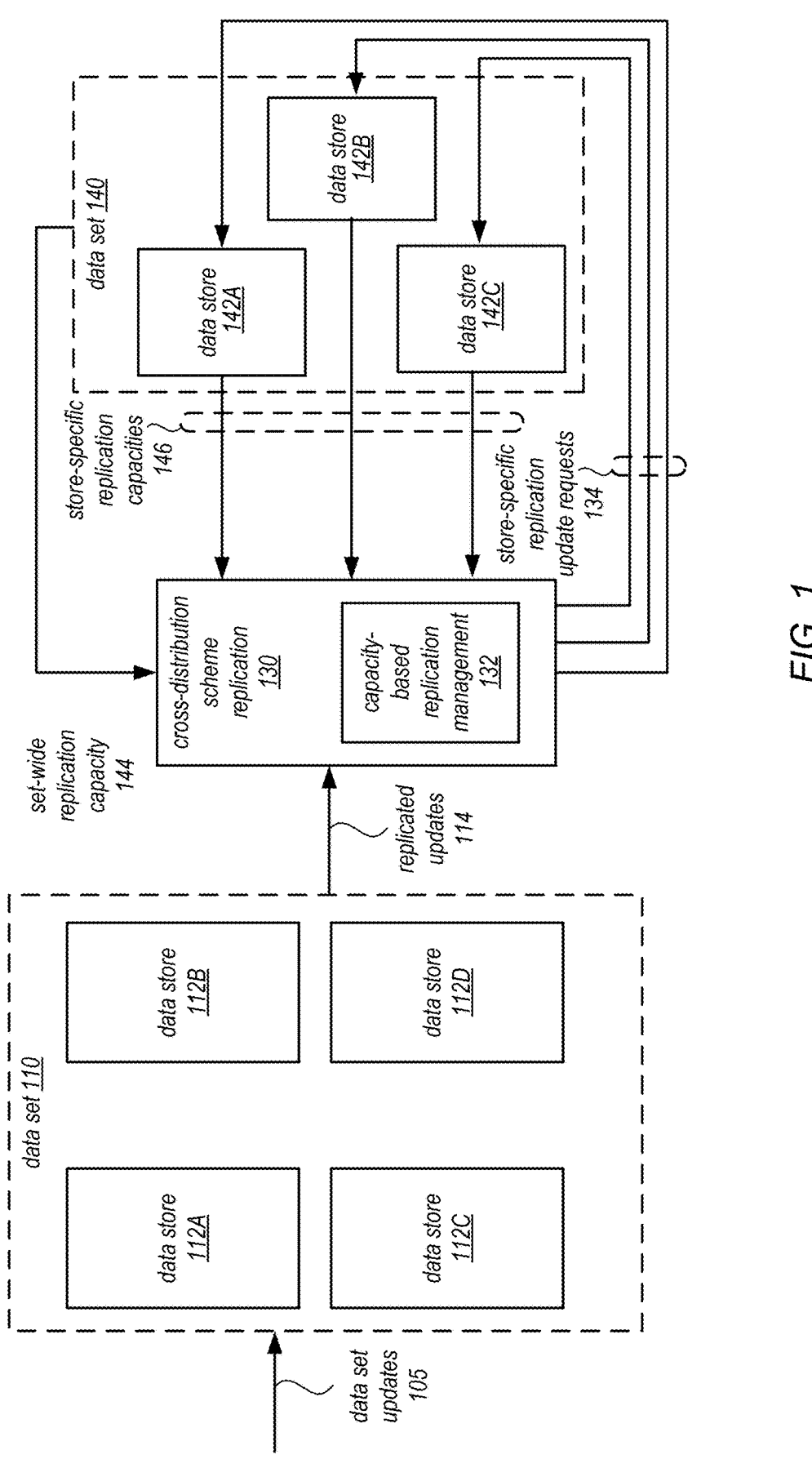
FIG. 1 is a logical block diagram illustrating capacity-based replication management for replicating changes across data set distributions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement capacity-based replication management for replicating changes across data set distributions, according to some embodiments. Data sets may be distributed across one or more locations in a storage system, in some embodiments. In this way, clients can access and independently update different portions of the data set at the one or more locations in the storage system, in some embodiments. The arrangement of the data set may be optimal for some access requests (e.g., queries based on indexed fields or values in the table). However, to optimally process other access requests (e.g., queries based on non-indexed fields or values in a table), portions of the data set (or the entire data set) may be replicated in one or more other locations (e.g., a different storage nodes, systems, or hosts) in a different arrangement, subset, or format that is more performant for performing the other type of access requests according to a schema that defines the different arrangement, subset, or format, in some embodiments.

For example, in some scenarios, locating items that have particular attributes may cause a scan across all (or a large number) of items in order to locate the items with the particular attributes. However, a projection of the data set defined by a different schema can be used to identify those items with the particular attributes. The different schema can be used to create the projection of the data set (e.g., as a secondary index), that provides an alternative data structure to search for items with those particular attribute values. For instance, a table that includes items for registered users may include a user identifier, which may be a unique, primary key for the item, along with a first name attribute, last name attribute, location attribute, and age attribute. A secondary index may be generated for the table which can index items according to other values than the key value pair, such as location and age. For example, the secondary index may be generated so that all items with same location and attribute values are stored together according to age attribute value order. In this way, an access request for data that specifies a particular range of ages for a location may be quickly obtained without performing a scan of the entire table of items, as noted above. Other attribute values may also be defined by the schema and thus included in the projection, such as first and last name attribute values.

Instead of relying upon the resources of a source storage location for data set to create a new replica of a data set, such as a projected data subset like a secondary index as discussed below, techniques that index or otherwise determine which portions of a source data to replicate to the new replica using other resources, such as a separate system component or node, may be implemented. Different replication techniques, such as different conditional propagation architectures as discussed below with regard to FIGS. 2-6, may offer different performance advantages to maintaining projected data subsets.

Because replication may occur between data sets that are differently distributed (e.g., between source tables and secondary indexes), performance improvements may be achieved by intelligently managing the workload to replicate changes between the different data sets. When data sets are distributed differently (e.g., according to different schemas), there may not be a one-to-one correspondence between updates made to a location in a source data set and a location in a target data set, as there may be multiple source locations merged into one target location and/or one source location distributed across multiple target locations. Such situations may result in scenarios where locations in a target data set receive more heat than a corresponding location in the source data set. If the work to perform replication is not properly managed, performance bottlenecks caused by one storage location in the target data set can spill over and impact other storage locations in the target data store and/or backup replication work performed at the source data set. Therefore, techniques that can consider the capacity of both individual storage locations for a target data set as well as the target data set as a whole, as discussed in detail below, may avoid negative performance impacts of an overburdened target data store.

FIG. 1 is a logical block diagram illustrating capacity-based replication management for replicating changes across data set distributions, according to some embodiments. Data sets 110 and 140 may be respective database table (or tables) or other data set, collection, or grouping of data items, where the data items may be stored in data stores 112A-D and 142A-C, respectively. Data set 110 may be data items distributed according to a first schema, and data set 140 may be data items distributed according to a second schema, where the schemas may define how data is organized within the data sets 110 and 140. For example, as discussed in detail below with regard to FIGS. 2-6, data set 110 may be one or more database tables and data set 140 may be a projected data subset such as a secondary index (which may include different types of secondary indexes in various embodiments, such as a global secondary index generated from distributed partitions of a source table across different storage nodes and separately hosted from the source database tables as opposed to a local secondary index which may be generated only from a single data partition, which may or may not be stored on that same host). Data set updates 105 may be accepted and performed at data set 110, where data set updates 105 may be various types of actions, modifications, or changes to items of data set 110.

In various embodiments, data set updates 105 may include one or more updates to the data set 110, where performing the updates, by data set 110, may include updating individual data store(s) 112A-D of the data set 110. For example, an update 105 may be received which may only require data store 112A to be updated. In other examples, other updates 105 may be received which may require a different data stores to be updated (e.g., 112B, or multiple data stores (e.g., 112A, 112C, and 112D). The data set 110 may be associated with the data set 140, where performing updates to the first data set 110 may cause performance of further updates to the data set 140 (e.g., the data set 110 may be a source table and the data set 140 may be a secondary index of the source table 110, similar to the storage node(s) for source table 410 and the storage node(s) for secondary index 430 discussed below with regard to FIGS. 4-5, etc.), as illustrated by replicated updates 114. The data set 110 and the data set 140 may be organized according to different schemas (e.g., distribution of data within data set 110 may be different than the distribution of data within data set 140, etc.), which may cause a determination as to which one(s) of data store(s) 143A-C of data set 140 should replicate an update received at data set 110 (including scenarios where an update should not be replicated to any one of data stores 142). Cross-distribution scheme replication 130 may be implemented to receive the further updates to replicate 114, determine which data store(s) 142A-C are associated with the replicated updates 114, and send store-specific replication update requests 134 to individual data store(s) 142, to perform the replicated updates 114 on the data set 140, based on the determination at cross-distribution scheme replication 130.

According to some embodiments, cross-distribution scheme replication 130 may include in-memory queues (e.g., storage buffers 326A-B and working buffers 323A-B, as discussed in detail below with regard to FIG. 3, etc.) to retain received replicated updates 114 to perform on the data set 140 and perform the received replicated updates 114 asynchronously, when the data set 140 is available to perform the replicated updates 114 (e.g., the cross-distribution scheme replication 130 may determine heat, or a current workload of the data set 140, and the cross-distribution scheme replication 130 may send the updates when the current workload of the data set 140 may support performing the updates, etc.).

According to various embodiments, as part of replicating the updates 114 to the data set 140, the cross-distribution scheme replication management 130 may include capacity-based replication management 132 in order to determine if the received updates 114 may be performed on the data set 140. Determining if the replicated updates 114 may be performed on the data set 140, may include performing various capacity checks associated with the data set 140, as illustrated by set-wide replication capacity 144 check, and performing various store-specific replication capacity 146 checks associated with individual ones of the data store(s) 142A-C of the data set 140. The set-wide replication capacity 144 check may be performed to determine if the data set 140 may support, or have sufficient capacity to perform the replicated updates 114 on data of the data set 140. For example, in at least one embodiment, a limit on replication across data set 140 may be enforced to prevent data stores 142 from performing other operations, such as requests to read data from data stores 142.

Then, as part of performing the replication of updates 114 on the data set 140, individual data store(s) 142A-C may be updated, for which individual store-specific replication capacities 146 checks may be performed, to determine if individual ones of the data store(s) 142A-C may perform the store-specific replication update requests 134 on data of respective data store(s) 142A-C, as part of replicating the updates 114 on the data set 140.

Individual data stores 142A-C of the data set 140 may perform various other operations in addition to the replication of updates 114 on the data set 140. As one of normal skill in the art will appreciate, implementing capacity-based replication management 132 to perform capacity checks associated with both, the set-wide replication capacity 144 of the data set 140, and the individual store-specific replication capacities 146 associated with individual ones of the data store(s) 142A-C, may improve a system or method employing the techniques discussed herein by first allowing the system to ensure that the replicated updates 114 may be performed in the data set 140, as well as secondly, avoiding negative performance impacts by, for example, overwhelming the data stores 142 storing data set 140 and/or creating hot spots within data store(s) 142A-C related to replicating the updates 114 on the data set 140.

Upon determining, by capacity-based replication management 132, that the set-wide replication capacity 144 and individual store-specific replication decision(s) 134 for respective data store(s) 142A-C have sufficient capacity for replicating the updates 114, the cross-distribution scheme replication 130 may send, to individual data store(s) 142A-C, store-specific replication update requests 134, according to some embodiments. The data store(s) 142A-C which may receive store-specific replication decisions 134, as part of replicating the updates 114, may be based on a determination of which data store(s) 142A-C should be updated according to the schema for data set 140, as discussed in detail above.

In some embodiments, upon determining that either, or both, the set-wide replication capacity 144 and the store-specific replication capacit(ies) 146 may not suffice for performing replicating the updates 114, the cross-distribution scheme replication 130 may delay replicating the updates 114 for a period of time. After the period of time, cross-distribution scheme replication 130 may attempt replicating the updates 114, by checking again for capacities of the set-wide replication capacity 144 and the store-specific replication capacity(es) 146.

A data store 142 of the data stores 142A-C may receive a store-specific replication decision 134 indicating replicated updates 114 to perform to items stored in the data store 142, according to some embodiments. The data store 142 may determine if the data store 142 can perform the store-specific replication decision 134 (e.g., the data store 142 does another capacity check to ensure the store-specific replication decision 134 can be performed, even if the cross-distribution scheme replication 130 performed its own capacity check for the data store 142, etc.). Upon determining the data store 142 may suffice in capacity to perform the update, the data store 142 may proceed and perform the requested update 134. Performing the updates 134, by the data store 142, may include modifying one or multiple items of the data store 142. Although the techniques above for performing updates on data store 142 were recited for a single data store 142 of data stores 142A-C, other ones of the data stores 142 may also perform their own respective capacity checks.

In some embodiments, the data store(s) 142A-C may send store-specific replication capacities 146 to the cross-distribution scheme replication 130. In some embodiments, store-specific replication capacities 146 may include numbers, counts, or rates of requests that are being seen for replication updates requests 134 at the particular data store and/or numbers, counts, or rates of other requests received (e.g., client application requests to read data from data stores 142). In some embodiments, store-specific replication capacities may include computer resource measurements or metrics for computing resources used for store-specific replication update requests 134 and/or other requests (e.g., utilization of processor, memory, storage, network and/or I/O). In some embodiments, store-specific replication capacities 146 may be based on replicating or rejecting the store-specific replication decisions 134. For example, upon accepting and updating items of data store 142, data store 142 may send a confirmation to the cross-distribution scheme replication 130, as the store-specific replication capacity 146. In other embodiments, upon rejecting the store-specific replication decision, the data store 142 may send a rejection to the cross-distribution scheme replication 130 as the store-specific replication capacities 146.

In some embodiments, the cross-distribution scheme replication 130 may receive the store-specific replication capacities 146 and utilize the store-specific replication capacities 146 to determine capacity of respective data stores 142A-C for performing replicating updates 142, as discussed in detail above. The cross-distribution scheme replication 130 may track individual capacities for each of the data stores 142A-C, which may be utilized by capacity-based replication management 132 to determine capacity for performing replicating updates 114, in some embodiments.

In various embodiments, the cross-distribution scheme replication 130 may also utilize the store-specific replication capacities 146 to determine if a replicated update 114 has been completed. For example, based on the determined data store(s) 142A-C associated with performing replicating the updates 114, the cross-distribution scheme replication 130 may determine replicating the updates 114 has been completed until the cross-distribution scheme replication 130 receives store-specific replication capacities 146 from each of the determined data store(s) 142A-C associated with replicating the updates 114.

Based determining one or more data store(s) 142A-C rejected store-specific replication decisions 134, according to some embodiments, the cross-distribution scheme replication 130 may determine performing the replication of the updates 114 has not been completed. The cross-distribution scheme replication 130 may wait for a specific window of time (e.g., delay for a period of time), and the cross-distribution scheme replication 130 may send store-specific replication decisions 134 to each of the data store(s) 142A-C which returned a rejection 146, after determining that each of those data store(s) 142A-C may suffice in capacity, as well as the set-wide replication capacity 144 for the data set 140.

According to some embodiments, cross-distribution scheme replication 130 may receive multiple replicated updates 114 to perform to one or various data stores 142A-C of data set 140. Cross-distribution scheme replication 130 may store the multiple replicated updates 114 in a buffer of the cross-distribution scheme replication 130, and the cross-distribution scheme replication 130 may perform the received multiple updates, individually and asynchronously. To perform the various updates asynchronously, the cross-distribution scheme replication 130 may implement methods and techniques for fairness of received replicated updates 114, where fairness of received replicated updates 114 may include keeping track of a time of arrival of received replicated updates 114, and prioritizing older received replicated updates 114, as discussed in detail below with regard to FIG. 3.

Although not illustrated, the techniques and components illustrated in FIG. 1 function as an example of replicating updates from a first data set 110 to a second data set 140, where the first and second data set include different schemas. However, components such as data sets 110 and data set 140 may include more or less data store(s) 112A-D and 142A-C, than illustrated. Similarly, cross-distribution scheme replication 130 may include more components than the capacity-based replication management 132. The various previous descriptions of data store, data set, replication techniques, and capacity verification, are not intended to be limiting, but are merely provided as logical examples.

This specification continues with a general description of a provider network that may implement a database service that may implement capacity-based replication management for replicating changes across data set distributions. Then, various examples of database service are discussed, including different components/modules, or arrangements of components/modules, that may be employed as part of implementing the database service, in some embodiments. A number of different methods and techniques to implement capacity-based replication management for replicating changes across data set distributions, are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
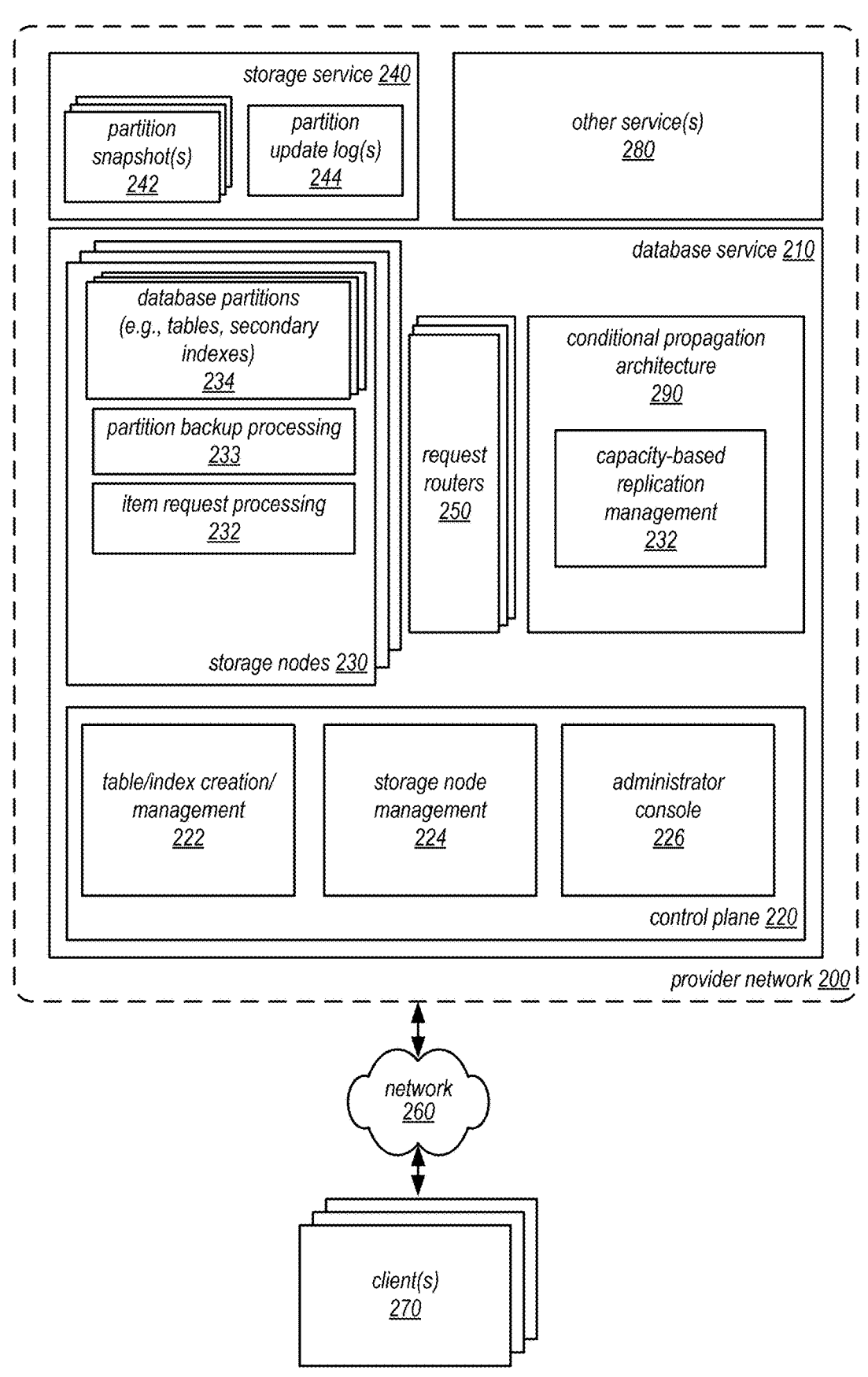
FIG. 2 is a logical block diagram illustrating a provider network offering a database service that may implement capacity-based replication management for replicating changes across data set distributions, according to some embodiments.

FIG. 2 is a logical block diagram illustrating a provider network offering a database service that may implement capacity-based replication management for replicating changes across data set distributions, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 10000 described below with regard to FIG. 9), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may implement various types of distributed database services, in some embodiments, for storing, accessing, and updating data in tables hosted in a database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL)) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routers 250, in some embodiments. Request routers 250 may receive and parse client access requests, in various embodiments in order to determine various features of the request, to parse, authenticate, throttle and/or dispatch access requests, among other things, in some embodiments.

In some embodiments, database service 210 may implement control plane 220 to implement one or more administrative components, such as automated admin instances or nodes (which may provide a variety of visibility and/or control functions). In various embodiments, control plane 220 may direct the performance of different types of control plane operations among the nodes, systems, or devices implementing database service 210, in some embodiments. Although not illustrated, control plane 220 may provide visibility and control to system administrators via administrator console, in some embodiment. Administrator console may allow system administrators to interact directly with database service 210 (and/or the underlying system). In some embodiments, the administrator console may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with storage nodes 230 to initiate the performance of various control plane operations, such as moves of table partitions, merges of table partitions, splits of table partitions, update tables (e.g., data set updates 105 and replicated updates 114 with regard to FIG. 1, etc.), delete tables, create secondary indexes, etc. . . . . In some embodiments, control plane 220 may include a node recovery feature or component that handles failure events for storage nodes 230, propagation architectures 290 and request routers 250 (e.g., adding new nodes, removing failing or underperforming nodes, deactivating or decommissioning underutilized nodes, etc.).

Various durability, resiliency, control, or other operations may be directed by control plane 220. For example, storage node management 224 may detect merge, split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other database service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below).

In some embodiments, database service 210 may also implement a plurality of storage nodes 230, each of which may manage one or more partitions of a database table or secondary index on behalf of clients/users or on behalf of database service 210 which may be stored in database storage 234 (on storage devices attached to storage nodes 230 or in network storage accessible to storage nodes 230).

In some embodiments, database service 210 may also implement conditional propagation architecture 290, which may manage replication of updates performed on a first data set, to a second data set, where the first and second data sets may include different distributions (e.g., according to different schemas). The conditional propagation architecture may include capacity-based replication management 295 which may determine capacities related to the first and second data sets for replicating updates, as well as determining partition-specific capacities of the first or second data sets, for replicating the updates.

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). In some embodiments, item request processing 232 may perform operations to update, store, and/or send an update replication log to a propagation architecture 290, as discussed below with regard to FIG. 3.

In some embodiments, database service 210 may provide functionality for creating, accessing, and/or managing tables or secondary indexes at nodes within a multi-tenant environment. For example, different database partitions 234 may store table item(s) from respective tables, indexes, or other data stored on behalf of different clients, applications, users, accounts or non-related entities, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. Moreover, different replica groups may utilize overlapping nodes, where a storage node 230 may be a member of multiple replica groups, maintaining replicas for each of those groups whose other storage node 230 members differ from the other replica groups.

Different models or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the database service 210 (and the underlying storage system) may have no pre-defined format other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots 242 as backups. Storage service 240 may implement striping, sharding, or other data distribution techniques so that different portions of a partition backup 242 are stored across multiple locations (e.g., at separate nodes). In various embodiments, storage nodes 230 may implement partition backup processing 233 to store partition snapshots 242 (e.g., by storing a copy of a partition 234 as of a point-in-time as a snapshot object 242 in storage service 240. In at least some embodiments, update logs 244 (e.g., created by updates for database partitions 234 by item request processing 232) may be stored as objects in storage service 240.

Figure 3:
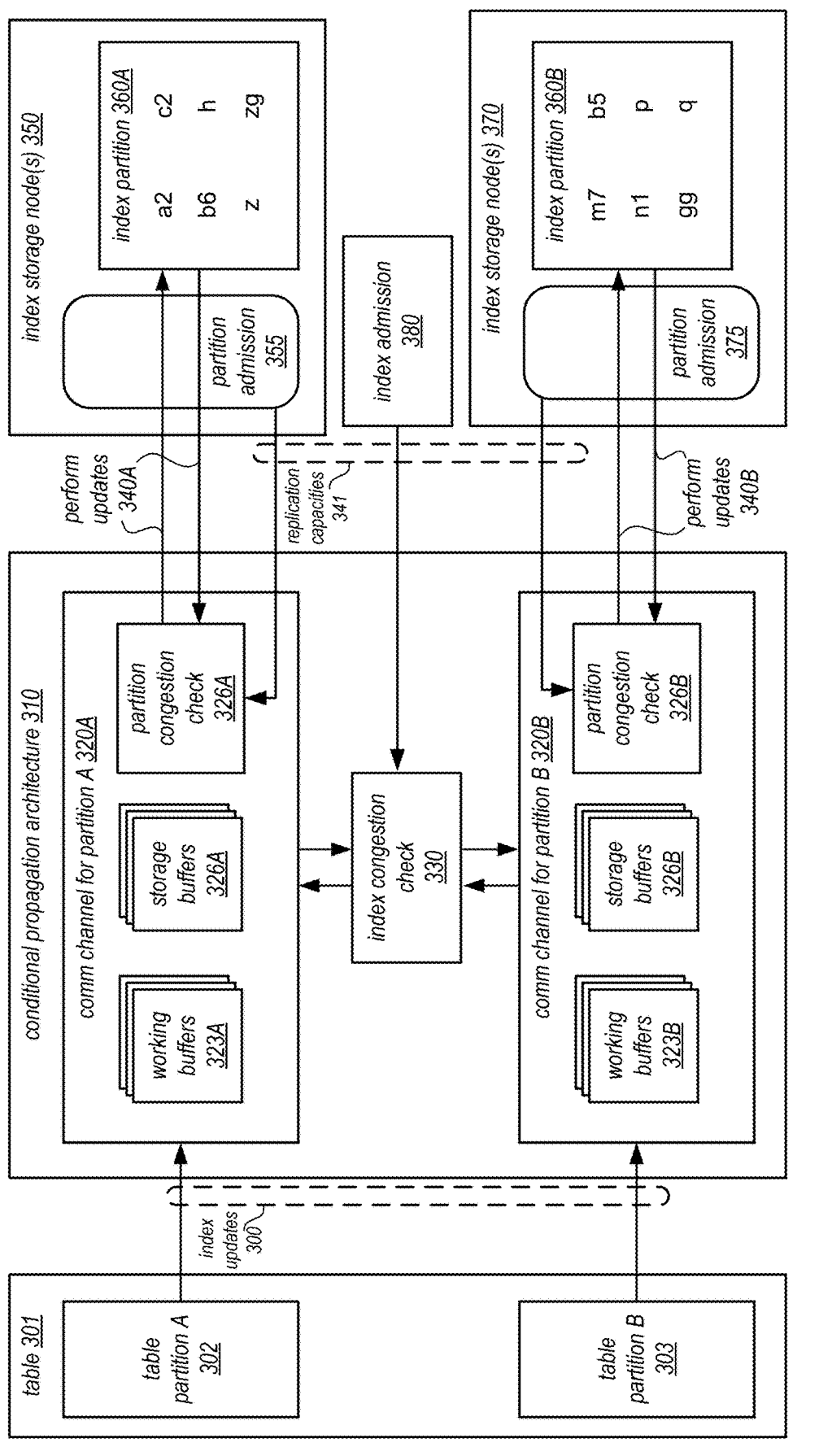
FIG. 3 is a logical block diagram illustrating a conditional propagation architecture replicating index updates on a partition of the index using capacity-based replication management, according to some embodiments.

FIG. 3 is a logical block diagram illustrating a conditional propagation architecture replicating index updates on a partition of the index using capacity-based replication management, according to some embodiments. FIG. 3 illustrates conditional propagation architecture 310, comm channel for partitions A 320A and B 320B, where comm channel for partition(s) 320A-B may receive index updates 300 and perform the index updates 300 on index partitions 360, as indicated by perform updates 340. Conditional propagation architecture 310 may include an index congestion check 330 to determine capacity of the index for performing the index updates 300. Conditional propagation architecture 310, index storage node(s) 350 and 370, and an index admission 380 may be implemented by a database service of a provider network, such as database service 210 of provider network 200 of FIG. 2.

According to some embodiments, index updates 300 may be updates performed to items stored in a database, such as different respective partitions A, 302, and B, 303, in table 301 (e.g., may be database partitions 234 of storage node 230 of provider network 200, as discussed in detail above in FIG. 2, etc.), where performing the updates stored in the database may require performing the index updates 300 on index partitions 360A-B (e.g., storage nodes 230 of FIG. 2, etc.).

The conditional propagation architecture 310 may include comm channel for partitions 320A-B, according to some embodiments. Each comm channel for partition 320A-B may be associated with different indexes, where the different indexes may both be associated with a similar source table. For example, a source table may perform updates on the source table, and as part of performing the updates on the source table, in some embodiments, more than a single index of the source table may require updating. The source table may send index updates 300 to each comm channel for partition 320 associated with each of the more than one indexes which require updating.

Conditional propagation architecture may include a fleet of computing resources (e.g., nodes) that implement respective communication channels for partitions 320, where each comm channel for partition 320 may then include working buffers 323, storage buffers 326, and partition congestion check 326, according to some embodiments. The storage buffers 326 may serve to store received index updates 300. The working buffers 323 may serve to store index updates 300, and associated metrics, which the comm channel for partition 320 is currently performing. The partition congestion check 326 may be utilized to determine if individual partitions of the index with which the comm channel for partition 320 is associated with, may perform the index updates 300, as indicated by perform updates 340.

A comm channel for partition 320, such as comm channel for partition A 320A, may receive index updates 300 to perform on a secondary index, according to some embodiments. The updates may be sent, for example, by storage nodes of a source table. The comm channel for partition A 320A may store received index updates 300 on storage buffers 326A. Upon determining the comm channel for partition A 320A can perform an index update 300 according to replication capacities 341, the comm channel for partition A 320A may move an index update 300 from the storage buffers 326A to the working buffers 323A.

In various embodiments, to perform an index update 300, the comm channel for partition A 320A may determine index partition(s) 360 associated with the index update 300, as well as index storage node(s) 350 for the determined index partition(s) 360. Although FIG. 3 illustrates comm channel for partition A 320A sending updates 340A, to perform, to the index partition 360A of the index storage node 350, in some embodiments, more than a single index partition 360 of the index may require updating. For such embodiments, the comm channel for partition A 320A may send an update 340 to perform, to each of the determined index partition(s) 360A and respective index storage node(s) 350. Similarly for comm channel for partition B 320B, which may receive updates for a different index than comm channel for partition A 320A, and the comm channel for partition B 320B may determine more index partition(s) 360B associated with the different index, than illustrated in FIG. 3 by index storage node 370.

The comm channels for partitions 320 may also determine a capacity of the associated index, an index-wide capacity applicable to all storage nodes hosting the index collectively, and capacities 341 of index storage nodes (e.g., 350 and 370), which may be referred to as node-specific capacities, that host determined index partition(s) 360, for performing the index update 300, according to some embodiments. For example, comm channel for partition A 320A may determine first if the index has sufficient capacity to perform the index updates 300, and then, the comm channel for partition A 320A may determine if individual index storage node(s) 350 associated with respective index partition(s) 360A has sufficient capacity to perform the index update 300. The comm channel for partition A 320A may first determine the index capacity, to determine if the index overall may support performing the updates. Then, the comm channel for partition A 320A may determine the individual capacity of storage node(s) 350 to determine if the individual index storage node(s) 350 may perform the updates (e.g., avoiding a hot spot of an index storage node 350, etc.). In some embodiments, node-specific capacity may be applicable to all partitions on an index storage node in scenarios, for instance, where index storage nodes are single-tenant (e.g., hosting data for only one "tenant", such as a single account of database service 210). In some embodiments, node-specific capacity may refer to capacity to perform updates to a particular partition, where other partitions hosted a same index storage node may have different capacities at the index storage node (e.g., in a multi-tenant scenarios an index storage node stores partitions of other indexes or tables for other accounts of database service 210).

According to some embodiments, as illustrated in FIG. 3, the comm channels for partition(s) 320 may access an index congestion check 330 to determine if respective index(es) for each comm channel for partition 320 have sufficient capacity for respective index updates 300. The index congestion check 330 may maintain track of capacities for each index associated with each comm channel for partition(s) 320 within the conditional propagation architecture 310. Although FIG. 3 illustrates only one index admission 380 component, there may be multiple index admissions 380, where there may be an individual index admission 380 for each comm channel for partition 320 (e.g., due to each channel for partition 320 being associated with an independent index, etc.). The index congestion check 330 may synchronize with each index admission 380, such that the index congestion check 330 may maintain accurate track of capacities of index(es), to provide to each comm channel for partition 320. The index congestion check 330 and the index admission(s) 380 may synchronize in the background, or when the conditional propagation architecture 310 may determine sufficient capacity of the conditional propagation architecture 310 to synchronize the index congestion check 330.

Upon determining, by the comm channel for partition A 320A, that the index capacity suffices for performing the index update 300, the comm channel for partition A 320A may then determine a partition capacity for the index partition 360A, according to some embodiments. The comm channel for partition A 320A may utilize partition congestion check 326A to determine the partition capacity for the index partition 360A. In various embodiments, the partition congestion check 326A may track capacities for each individual partition associated with the index associated with the comm channel for partition A 320A (e.g., similarly for comm channel for partition B 320B and index storage node 370, etc.).

Upon determining, by the comm channel for partition A 320A, that both the index capacity and the partition capacity are sufficient for performing the index update, the comm channel for partition A 320A may send the index update, as indicated by perform updates 340A, according to some embodiments.

Index storage node(s) 350 and 370 (e.g., storage nodes 230 of FIG. 2, etc.) may include an index partition 360A-B and a partition admission 355 and 375, respectively, according to some embodiments. Index partition 360A may contain items associated with a first index, where the first index may be associated with the comm channel for partition A 320A, and the index partition 360B may similarly contain items associated with a secondary index, where the secondary index may be associated with the comm channel for partition B 320B. The partition admission 355 and 375 may, respectively, be utilized to determine if each index storage node 350 and 370 may perform received updates to perform, 340A-B.

According to some embodiments, index storage node 350 may receive updates to perform 340A, and partition admission 355 may determine if the index storage node 350 may suffice in capacity to perform the updates 340A. Although comm channel for partition A 320A may determine capacity for performing the index update 300 prior to sending the perform updates 340A, the partition admission 355 may perform a second capacity check, to ensure the perform updates 340A may be replicated. For example, in some scenarios, replication capacities 341 may be stale or out-of-date information and so an index storage node 350 may no longer have capacity to perform an update. In some embodiments, the index storage node 350 may get overwhelmed when receiving the perform updates 340A, and the partition admission may determine capacity of the index storage node 350 to avoid a hot spot on the index storage node 350 (e.g., similarly for comm channel for partition B 320B and partition admission 375 of index storage node 370).

According to some embodiments, based on a determination, by the partition admission 355, that the index storage node 350 has sufficient capacity to perform the updates 340A, the index storage node 350 may perform the updates items of the index partition 360A, based on the received perform updates 340A. After performing the updates 340A, the partition admission 355 may return a confirmation of the updates 340A to the partition congestion check 326A. The partition congestion check 326A may confirm the index update 300 was performed, may mark the index update 300 as completed, and may remove the index update 300 from the working buffers 323A.

In other embodiments, based on a determination, by the partition admission 355, that the index storage node 350 may not suffice in capacity to perform the updates 340A, the partition admission 340 may reject the updates 340A and return a rejection to the partition congestion check 326A. The partition congestion check 326A may determine, from the rejection, that the index update 300 was not performed.

The comm channel for partition A 320A may move the index update 300 from working buffers 323A to storage buffers 326A.

After a period of time, the comm channel for partition A 320A may move the index update 300 from the storage buffers 326A to the working buffers 323A, may determine capacity for performing the index update 300, and may send again the index update 300 as perform updates 340A. The comm channel for partition A 320A may repeat these techniques until the index update 300 is performed on the index partition 360A, or other associated index partition. In some embodiments, during the period of time when the index update 300 may be at the storage buffers 326A after being rejected, the comm channel for partition A 320A may move a different index update 300 to the working buffers 323A, and the comm channel for partition A 320A may perform the different index update 300.

In other embodiments, the comm channel for partition A 320A may move an index update 300 from working buffers 323A to storage buffers 326A, based on other factors. The other factors may include: determining that either the index capacity or the partition capacity, or both index and partition capacities, is not sufficient to perform an index update 300, etc. Upon moving an index update 300 to the storage buffers 326A, the comm channel for partition A 320A may wait for a period of time, and then, the comm channel for partition A 320A may move the index update 300 to working buffers 323A to perform the index update 300.

In some embodiments, upon receiving a confirmation from partition admission of successfully performing updates 340A, the comm channel for partition A 320A may immediately move a different index update 300, from storage buffers 326A to working buffers 323A, and attempt to perform the different index update 300 (e.g., given there are more index updates 300 stored in storage buffers 326A, etc.).

According to some embodiments, the window of time, or specific window of time that a comm channel for a partition 320 may wait before attempting again to perform an index update 300, may be a window of time provided by a provider network provisioning the conditional propagation architecture 310 (e.g., provider network of FIG. 2). In other embodiments, the specific window of time may be provided by a client such as the clients discussed above with regard to FIG. 2.

Other techniques may be implemented, by the conditional propagation architecture 310, to determine specific windows of time for comm channels for partitions 320, according to some embodiments. Some of the other techniques that may be implemented to determine the specific window of time, may be based on index and partition(s) capacities, to avoid providing heat to index partitions (e.g., overwhelming traffic at some partitions over others, etc.). Other examples of techniques, which may be utilized to determine the specific window of time, may include, and without limitation: exponential backoff, Propagational-Integral-Derivative (PID) controller, and standard control mechanisms (e.g., AIMD, Cubic, etc.).

According to some embodiments, the comm channel for partition A 320A may utilize token buckets and tokens to determine partition capacities for respective index partition(s) 360A (e.g., similarly for comm channel for partition B 320B and index partition(s) 360B, etc.). A token bucket may be a function of a bandwidth that an index partition may support, and a token of a token bucket may be a portion of the bandwidth which may be utilized to perform the index updates 300 on the respective index partition 360A.

In some embodiments, to determine capacity for performing an index update 300, the comm channel for partition A 320A may access a token bucket for the index partition 360A, of partition congestion check 326A. Based on determining the token bucket has sufficient tokens to perform the index update 300, the comm channel for partition A 320A may remove a token from the token bucket for index partition 360A. Upon receiving a confirmation or rejection from partition admission 355, the comm channel for partition A 320A may return the token to the token bucket, restoring the capacity for the index partition 360A.

According to some embodiments, as an example, an index partition 360A may support 1000 Kb per second. As such, a token bucket for the index partition 360A may be of a weight of 1 KB, and each token of the token bucket may be of 1 MB. When removing a token from the token bucket, a weight of 1 MB may be removed from the total 1 KB of the token bucket.

According to some embodiments, index congestion check 330 may similarly include token buckets for each index associated with each comm channel for partition 320. The token bucket for each index may function similarly to the token buckets of partition congestion check 326, where each comm channel for partition 320 may access token buckets for respective index, and subtract a token from the index token bucket given there is sufficient capacity. The token buckets for each index may synchronize with respective index admissions 380, as discussed in detail above.

According to some embodiments, partition admissions 355 and 375 may serve as local heat trackers that track an amount of bandwidth that each respective index partition 360A and 360B may serve, or be utilized by the conditional propagation architecture 310 to perform the index updates 300. The partition admission 355 and 375 may respectively share the amount of bandwidth each partition admission 355 and 375 may serve, as replication capacities 344, where each comm channel for partition A and B, 320A and 320B may utilize the shared amount of bandwidth to determine if each index partition 360A and 360B may suffice in capacity for replicating index updates 300. Each index partition 360A and 360B may be performing other operations other than replicating the index updates 300 (e.g., as discussed above with regard to storage nodes 230 of FIG. 2, etc.), and as such, each local heat tracker of each index partition 360A-B may function to estimate a total amount of work that each index storage node 350 may perform to avoid overshooting the system and degrade the system.

According to some embodiments, conditional propagation architecture 310 may optimize throughput of index updates 300 that may be performed on index storage node(s) 350 and 370. To optimize the throughput of performed index updates 300, each comm channel for a partition 320 of the conditional propagation architecture 310 may maintain track of parameters associated with performing updates 340. For example, comm channel for partition A 320A may maintain a count for how many perform updates 340A are accepted by index storage node 350, as well as another count for how many perform updates 340A are rejected by index storage node 350. From the accepted and rejected counts, comm channel for partition A 320A may modify its behavior to optimize throughput of index updates 300 performed on the index storage node 350. For example, based on an acceptance count being equal, or close to equal, to a total amount of index updates 300 performed on index storage node 350, the conditional propagation architecture 310 may determine the index storage node 350 was able to perform all the updates 340A successfully, and the next index update 300 may be performed immediately by comm channel for partition A 320A. If the conditional propagation architecture 310 determines the rejection count for comm channel for partition A 320A is equal, or greater than a threshold amount, the conditional propagation architecture 310 may determine the index partition 350A is currently busy (e.g., overwhelmed), and the conditional propagation architecture 310 may implement a delay for the com channel for partition A 320A prior to the comm channel for partition A 320A performing another index update 300 (e.g., waiting for a specific window of time, etc.). In other embodiments, based on acceptance count being greater than certain percentage of rejection counts, the conditional propagation architecture 310 may determine that index partition 360A may be busy, and the conditional propagation architecture 310 may instruct comm channel for partition A 320A to perform other index updates 300 on other index partition(s) of index storage node 350 (not illustrated). If acceptance count is lesser than certain percentage of rejection counts, the conditional propagation architecture 310 may determine there are more rejections than admissions of updates 340A by index storage node 350, and conditional propagation architecture 310 may instruct comm channel for partition A 320A to implement a delay in-between performing index updates 300.

According to some embodiments, comm channels for partitions 320 may be configured to perform index updates 300, ensuring fairness in the execution of index updates 300 and prevent starvation of index updates 300. For example, for each received index update 300, comm channel for partition A 320A may maintain track of the time of receival of the index update 300. Then, index updates 300 stored in storage buffers 326A may be prioritized by comm channel for partition A 320A to be performed in the next update. If an index update 300 is determined to be associated with an arrival time greater than a threshold amount of time, the conditional propagation architecture 310 may override the comm channel for partition A 320A, instructing the comm channel for partition A 320A to perform the index update 300 associated with the determined time. In some embodiments, if an index update is determined to be associated with an arrival time greater than the threshold, and the index update is rejected by the index storage node 350 when trying again to perform the index update 300, the comm channel for partition A 320A may attempt immediately to perform the index update 300, increasing the odds of performing the index update 300.

According to some embodiments, index partitions 360 may be split. An index partition 360 may be split for a variety of reasons, including an index storage node, such as 350 or 370, being a hot spot (e.g., overwhelming amount of traffic on that storage node, etc.). In other embodiments, an index partition 360 may be split due to a request, for example, from a client such as the clients discussed above with regard to FIG. 2.

Splitting an index partition 360 may include modifying a comm channel for partition 320 associated with the split index partition 360. Some modifications may include assigning working buffer(s) 323A to each split of the index partition 360, in order to perform index updates 300 on the split index partition 360 (e.g., when index updates 300 require updating items stored in either, or both, of the segments of the split index partition 360, etc.). Other modifications may include splitting a token bucket associated with the index partition 360A, according to the split of the index partition 360A (e.g., the token bucket may be split according to how the index partition 360A is split, providing equal token bucket weight to both splits, etc.).

According to some embodiments, a comm channel for a partition 320 may receive multiple index updates 300, where the multiple index updates 300 may be associated with one or multiple updates to a source table. The comm channel for partition 320 may store the multiple index updates 300 on the storage buffers 326, and the comm channel for partition 320 may move index updates 300 to working buffers 323 to perform the index updates 300. The comm channel for partition 320 may include working buffers for each index partition of the index associated with the comm channel for partition 320. For each received index update 300 determined to update a different index partition 360 of the index, the comm channel for partition 320 may move an index update to each working buffers 323, and simultaneously may perform index updates for each index partition 360 associated with each working buffer 323 of the comm channel for partition 320A.

In other embodiments, an index may be modified which may require modifying the conditional propagation architecture 310. Some index modifications which may cause modifying the conditional propagation architecture 310, may include splitting an index, re-provisioning an index, among others. Modifying the conditional propagation architecture 310, based on modifying the index, may include assigning a new comm channel for partition 320 to the modified index, or assigning new comm channels for partitions 320 for each split of the index (e.g., in cases where an index is split into multiple components, etc.). Index token buckets associated of index congestion check 330 associated with the modified index, may be deleted or erased, and new index token buckets may be created and synchronized for the one or more new index(es) based on the modified index.

In some embodiments, a comm channel for a partition 320 may receive index updates 300 when the buffers of the comm channel for partition A 320A may be full. The comm channel for partition 320 may be currently performing one or multiple index updates 300 with working buffers 323, and the storage buffers 326 may be completely full with other index updates 300 to perform. Upon receiving further index updates 300, when a comm channel for a partition 320 may be full, the comm channel for the partition 320 may reject the received further index updates 300.

Figure 4:
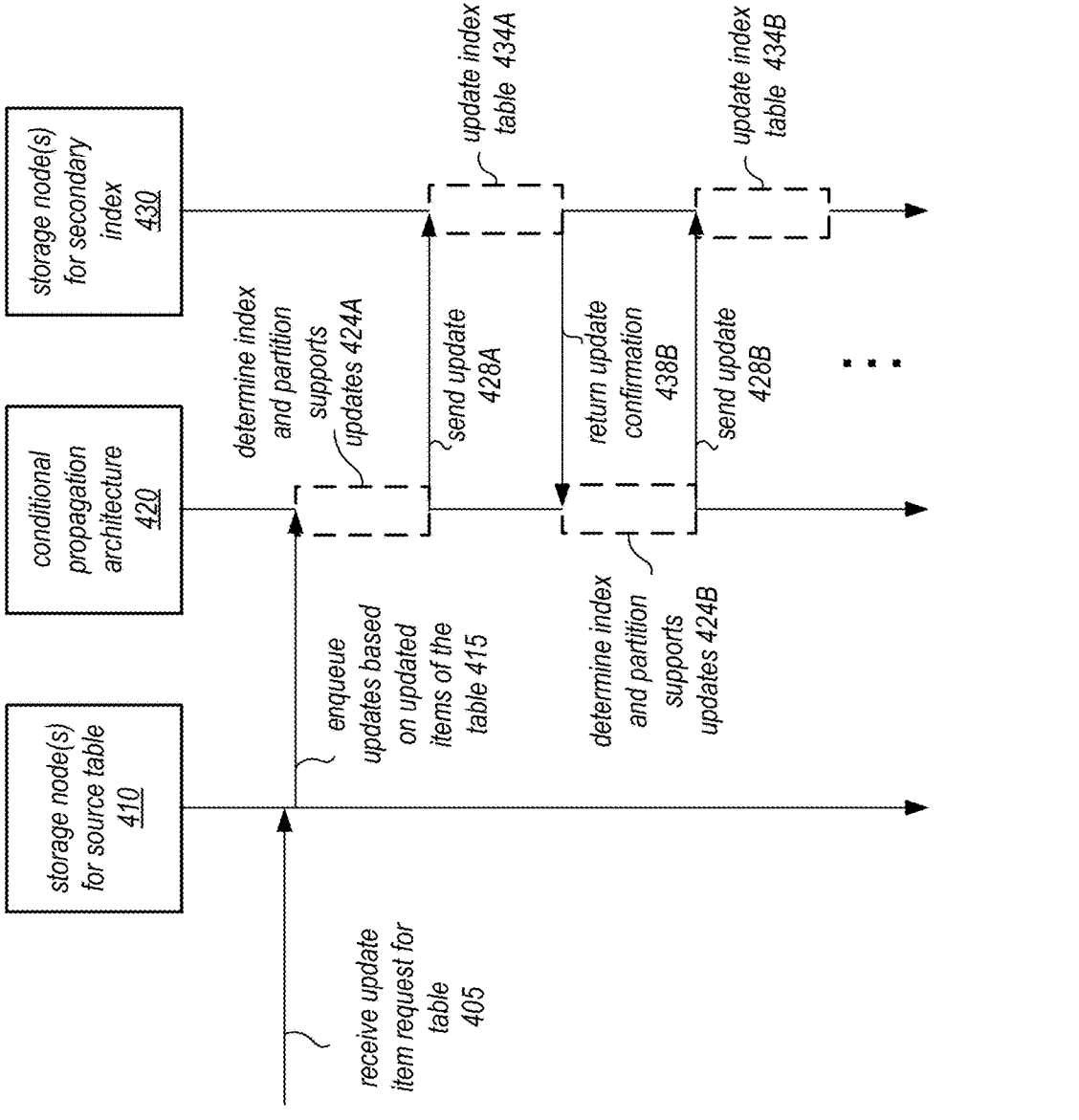
FIG. 4 is a logical block diagram illustrating interactions to replicate updates to a secondary index based on prior updates performed at a source table, according to some embodiments.

FIG. 4 is a logical block diagram illustrating interactions to replicate updates to a secondary index based on prior updates performed at a source table, according to some embodiments. FIG. 4 illustrates storage node(s) for source table 410 (e.g., similar to storage nodes 230 as discussed above with regard to FIG. 2, etc.), conditional propagation architecture 420 (e.g., similar to cross-distribution scheme replication 130 of FIG. 1, and/or similar to conditional propagation architectures 290 and 310 as discussed above with regard to FIGS. 2 and 3, respectively, etc.), and storage node(s) for secondary index 430 (e.g., also similar to storage nodes 230 as discussed above with regard to FIG. 2, and index storage nodes 350 and 370 as discussed above with regard to FIG. 3, etc.).

Storage node(s) for source table 410 may receive a request to update items of a table (or multiple tables) as indicated at 405, according to some embodiments. The request to update items of a table may be received from a user (e.g., clients 270 of FIG. 2, etc.) of database service 210, and based on the received update items request, the storage node(s) for the source table 410 may perform the updates, and determine one or more secondary updates to replicate to a secondary index of the source table. For example, the storage node(s) 410 may perform the updates on items of the source table, and based on the items with the updates performed, the storage node(s) 410 may determine the secondary updates to perform to the secondary index. The secondary index may be a projected data subset of the source table, as discussed above with regard to FIG. 1. As indicated at 415, storage node(s) for source table 410 may enqueue updates, or the secondary updates, to a conditional propagation architecture 420.

Conditional propagation architecture 420 may receive the updates for the secondary index based on the source table updates, as indicated at 415, according to some embodiments. Conditional propagation architecture 420 may then analyze the receive update 415, and determine a secondary index associated with the update, as well as identifying a partition and storage node for the secondary index 430 which may contain items of the secondary index to be updated as part of the received request 415. Conditional propagation architecture 420 may include communication channels for partitions such as 320A-B discussed above with regard to FIG. 3, which may perform the various operations of replicating the update 415 to the storage node of the secondary index 430.

As indicated at 424A, the conditional propagation architecture 420 may determine that the secondary index and the partition of the secondary index may support performing the updates, (e.g., checking the updates against in-memory flow control), according to some embodiments. The conditional propagation architecture 420 may first obtain a secondary index-wide capacity, and determine if the secondary index supports the updates 415. Based on determining the secondary index supports the updates 415, the conditional propagation architecture 420 may proceed to determine if the partition of the secondary index to which the updates 415 need to be performed, supports the updates 415. As discussed above with regard to FIG. 3, the conditional propagation architecture 420 may access a token bucket for the partition for the secondary index to determine if the partition for the secondary index supports performing the update. In some embodiments, based on a determination that either, or both, the secondary index and the partition of the secondary index may not support the updates 415, the conditional propagation architecture 420 may delay performing the updates 415 for a specific period of time.

As indicated at 428A, the conditional propagation architecture 420 may send the updates to the storage node for the secondary index 430 (e.g., partition of the secondary index), according to some embodiments. The updates 428 may include updates to one or more items stored in the storage node for the secondary index 430, where, as discussed above, the updates may be based on the source table items updated prior. The storage node for the secondary index 430 may receive the updates 428A, and determine if the storage node for the secondary index 430 may perform the update on the items. For example, the storage node for the secondary index 430 may receive a surge of requests after the conditional propagation architecture 420 determines the capacity for performing the updates on the storage node for the secondary index 430; the storage node for the secondary index 430 may experience a technical error, or another unexpected problem might occur that might impede the storage node for the secondary index 430 to perform the updates 428A. As indicated at 434A, based on determining the storage node 430 may perform the update to the items, the storage node 430 may perform the update to the items stored in the storage node 430, and as indicated at 438B, the storage node for the secondary index 430 may return a confirmation indication of the update to the conditional propagation architecture 430. In other embodiments, based on a determination by the storage node 430 that the storage node 430 may not perform the updates 428A, the storage node 430 may reject the updates 428A and return an indication of rejection at 438B instead of the confirmation indication.

According to some embodiments, the conditional propagation architecture 420 may utilize received confirmation and rejections indications from the storage node(s) for secondary index 430 in order to optimize throughput of replicating updates on the secondary index based on source table updates, according to some embodiments. For example, as discussed above with regard to FIG. 3, the conditional propagation architecture 420 may increase a throughput of updates to the secondary index based on received confirmation indications (e.g., the secondary index and/or partition of the secondary index may support more updates), and the conditional propagation architecture may reduce a throughput of updates to the secondary index based on received rejection indications (e.g., the secondary index and/or partition of the secondary index may be overwhelmed, etc.).

According to some embodiments, the conditional propagation architecture 420 may receive multiple updates to replicate to the secondary index. After performing an update to the storage node for the secondary index 430, the conditional propagation architecture 420 may dequeue another update to perform to the storage node for the secondary index 430. As indicated at 424B, 428B, 434B, etc. the conditional propagation architecture may continue to perform the updates to the secondary index by determining there is sufficient capacity prior to sending the updates to storage nodes for the secondary index, as discussed above, for a reminded of updates to perform to the secondary index.

According to some embodiments, the multiple received updates to replicate to the secondary index, may include updates 415 to replicate to different storage nodes of the secondary index 430. The conditional propagation architecture 420 may perform each update 415, communicating with each storage node of the secondary index 430, similarly to the techniques discussed above with regard to FIG. 3 of performing index updates 300 to multiple index partition(s) 360. For example, conditional propagation architecture may perform a first update 415 on a first storage node for a secondary index 430, as indicated at 428A. As indicated at 438B, the conditional propagation architecture may receive a confirmation of the first update. As indicated by send update 428B, the conditional propagation architecture may perform a different update 415 to a different storage node for the secondary index 430, where the conditional propagation architecture may send the update 428B to the different storage node for the secondary index 430. The conditional propagation architecture 420 may repeat these techniques for as many updates 415 are enqueued, as well as for as many storage node(s) for the secondary index 430 are required.

Figure 5:
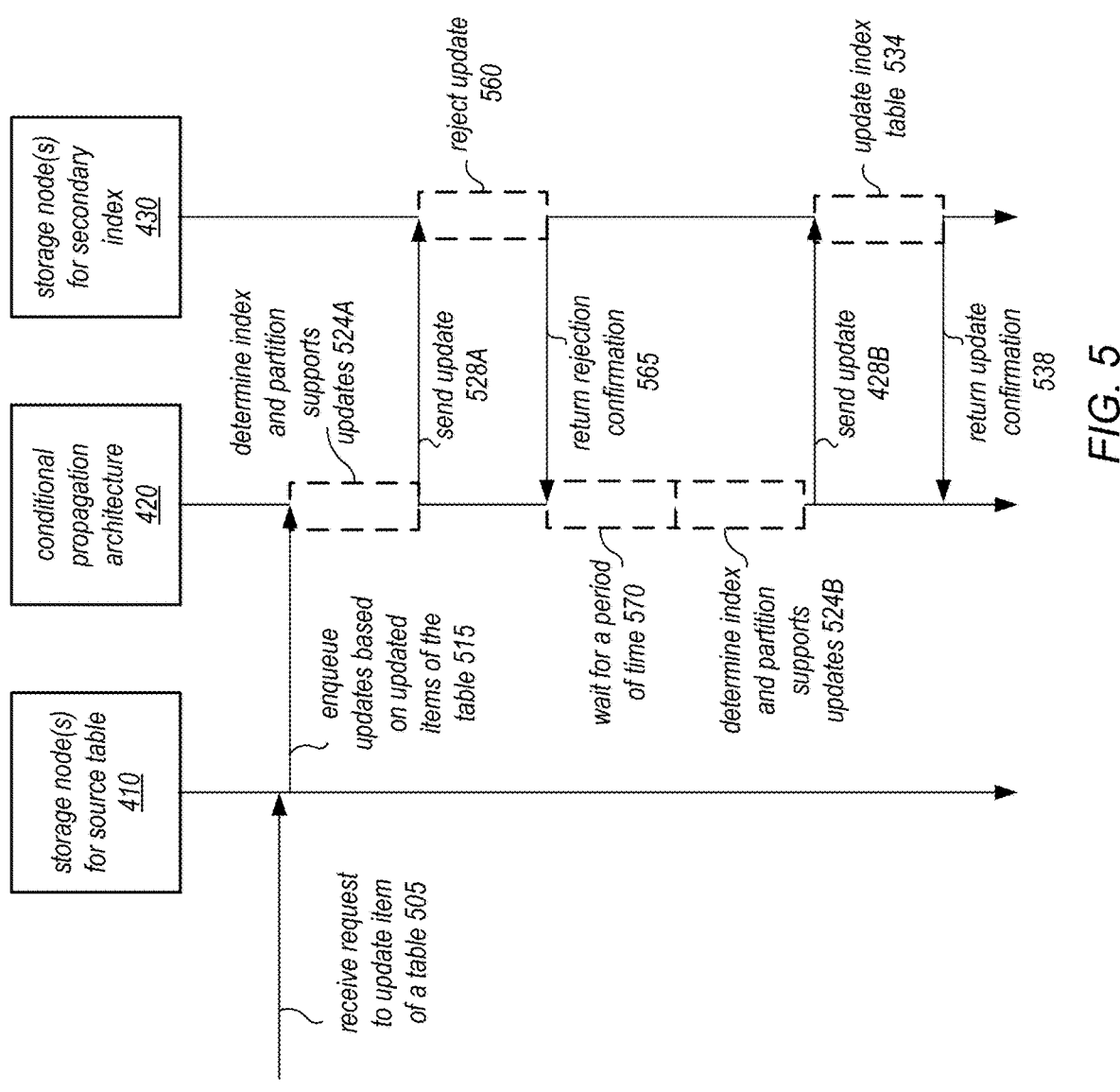
FIG. 5 is a logical block diagram illustrating example interactions to replicate updates to a secondary index based on prior updates performed at a source table when the secondary index rejects the update, according to some embodiments.

FIG. 5 is a logical block diagram illustrating example interactions to replicate updates to a secondary index based on prior updates performed at a source table, where the secondary index may reject the update, according to some embodiments. FIG. 5 illustrates storage node(s) for source table 410, conditional propagation architecture 420, and storage node(s) for secondary index 430, which may be the same as the ones discussed above with regard to FIG. 3. Also, similarly, storage node(s) for source table 410 may receive a request to update an item of a table, as indicated at 505, and the storage node(s) for the source table 410 may perform the updates on items of the source table 410, and as indicated at 515, the storage node(s) for the source table 410 may enqueue updates based on the updated items of the table. Conditional propagation architecture 420 may determine the index and partition supports the updates, as indicated at 524A. However, unlike FIG. 4, the storage node(s) for the secondary index 430 may reject the received updates, as indicated at 560. For example, as discussed above with regard to FIG. 4, the storage node for the secondary index 430 may be unavailable to perform the updates (e.g., the storage node 430 may be overwhelmed, or out of service, etc.).

As indicated at 565, the storage node for the secondary index 430 may send a rejection confirmation to the conditional propagation architecture 420, according to some embodiments. Conditional propagation architecture 420 may receive the rejection indication, and determine that the update 515 has not been performed. Conditional propagation architecture may proceed to wait for a period of time (e.g., delay), as indicated at 570. For example, in some embodiments, conditional propagation architecture 420 may implement exponential back-off to determine the period of time to wait prior to re-attempting performing the updates 515 on the storage node for the secondary index 430.

According to some embodiments, as indicated at 524B, the conditional propagation architecture 420 may re-determine if capacity of the secondary index and partition may support the updates 515 (e.g., secondary index or partition may receive heat during the period of time). As indicated at 428B, after determining the secondary index and partition suffice in capacity to perform he updates 515, the conditional propagation architecture 420 may send the updates to the storage node for the secondary index 430. the storage node for the secondary index may perform the update and return a confirmation update, as indicated at 534 and 538, respectively, similar to the embodiments discussed above with regard to FIG. 4.

Although FIG. 5 illustrates a single rejection from storage node for the secondary index 430, according to some embodiments, and as one of normal skill in the art will appreciate, storage node for the secondary index may reject the updates 528 any number of times, and the conditional propagation architecture may wait for periods of time and re-try performing the updates on the storage node for the secondary index 430, until success.

Figure 6:
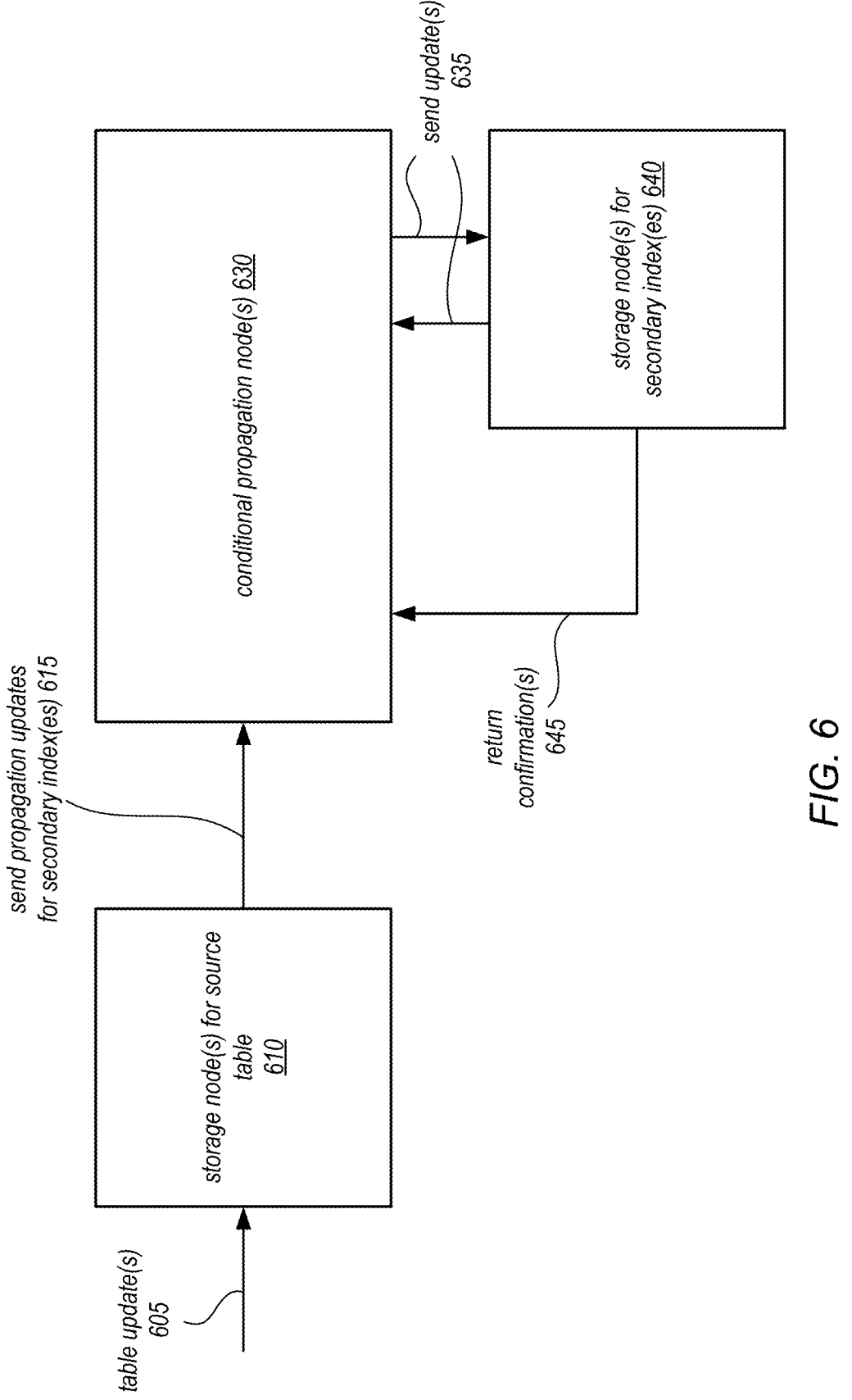
FIG. 6 is a logical block diagram illustrating example interactions to perform conditional propagation updates on a secondary index based on table updates, according to some embodiments.

FIG. 6 is a logical block diagram illustrating example interactions to perform conditional propagation updates on a secondary index based on table updates, according to some embodiments. FIG. 6 shows storage node(s) for source table 610 (e.g., may be storage nodes 230, as discussed above in detail with regard to FIG. 2, etc.) receiving table update(s) 605, which may include updates to items stored in a table of the storage node(s) 610. Storage node(s) for source table 610 may perform the table update(s) 605 and send propagation updates for secondary index(es) 615 to one or multiple conditional propagation node(s) 630, according to the table updates 605 performed on the source table (e.g., table updates 605 may update items which may require one or multiple secondary indexes to be updated, or table updates 605 could update items which may not require secondary indexes to be updated, in at least one embodiment).

According to some embodiments, conditional propagation node(s) 630 may be an example of conditional propagation architecture 310 as discussed above with regard to FIG. 3, where the conditional propagation node(s) 630 may include comm channels for partitions to perform the updates

615 on each secondary index (e.g., comm channel for each secondary index, etc.). The conditional propagation node(s) 630 may contain any number of comm channels to perform the secondary index updates 615. In some embodiments, the number of comm channels may be equal to a number of secondary indexes associated with the source table 610.

As indicated at 635, the conditional propagation node(s) 630 may send, as part of performing the updates to the secondary index(es) 615, the updates 635 to the storage node(s) for the secondary index(es) 640, according to some embodiments. The methods and techniques discussed above with regard to FIGS. 3-5, may be implemented within the sending of the updates 635 to the storage node(s) for the secondary index(es), where capacities for each secondary index and for each storage node of the secondary index, may be performed, for each secondary index 615, by each conditional propagation node 630.

The fleet of conditional propagation node(s) 630 may receive respective confirmations 646, indicating whether the storage node(s) for the secondary index(es) 640 performed the sent updates 635. Based on receiving confirmations, conditional propagation node(s) 630 may proceed to perform other secondary index updates 615, and based on receiving rejections, the conditional propagation node(s) 630 may delay performing the rejected secondary index update 615, for a period of time (e.g., similar to the techniques for delaying for a period of time, and waiting for a window of time, as discussed above with regard to FIGS. 1 and 3, respectively, etc.). The conditional propagation node(s) 630 may also utilize the acceptance and rejections from storage node(s) 640 to optimize throughput of secondary index updates 615 performed on secondary index(es), as discussed in detail above in FIG. 3.

The examples of a database that implements replicating index updates on a partition of the index using capacity-based replication management, as discussed in FIGS. 2-6 above, have been given in regard to a database service (e.g., a relational database, a document database, a non-relational database, etc.) However, various other types of database systems or storage systems can advantageously implement replicating updates to a second data set based on updates performed to a first data set, where the first data set and the second data set include different distribution schemas using capacity-based replication management, in other embodiments. FIG. 7 is a high-level flowchart illustrating various methods and techniques to implement replicating updates to a second data set based on updates performed to a first data set, where the first data set and the second data set include different distribution schemas, according to some embodiments. These techniques, as well as the techniques discussed with regard to FIGS. 8-9, may be implemented using components or systems as described above with regard to FIGS. 2-6, as well as other types of databases or storage systems, and thus the following discussion is not intended to be limiting as to the other types of systems that may implement the described techniques.

As indicated at 710, updates may be received for items stored in a first data set with, where the first data set may be distributed across first data stores, according to some embodiments. For example, the updates for the first data set may modify, insert, or delete items of the first data set (e.g., similar to data set updates 105 of FIG. 1, etc.). According to the updates performed on the first data set, one or more updates may be required to be replicated on a second data set, where the first data set and the second data set may be associated with one another (e.g., first data set may be a source table and second data set may be a secondary index of the source table, etc.). As indicated at 720, one of the update(s) may be replicated to the second data set.

According to some embodiments, replicating the one update to the second data set may include identifying a data store of the second data stores associated with the second data set, to replicate the one update, as indicated at 730. Then, as indicated at 740, capacities may be obtained to determine if the one update may be replicated on the second data set. The capacities which may be obtained may include a set-wide replication capacity, where the set-wide replication capacity may be a capacity associated with the second data stores, where the second data stores share the set-wide replication capacity, and a store-specific replication capacity associated with the identified data store for replicating the one update (e.g., similar to index capacity and partition capacity as discussed above in FIG. 3, etc.).

As indicated at 750, a determination to perform the one update on the identified data store may be made based on the obtained set-wide replication capacity and store-specific replication capacity, according to some embodiments. For example, different respective thresholds of minimum capacity (or maximum in-flight work) may be evaluated with respect to set-wide replication capacity and store-specific replication capacity. In at least one embodiment, token-based techniques to track or represent available and in-use capacity for a data set as a whole (e.g., a set-wide allocation of tokens) and individual, store-specific replication for a portion of the data set (e.g., data store specific allocation of tokens). As indicated at 760, based on a determination that either the obtained set-wide replication capacity or the store-specific replication capacity, or both, may not be sufficient to perform the one update, the replication of the one update may be delayed. In some embodiments, delaying the update to the second data set may include waiting for a specific window of time prior to re-trying to perform the update to the second data set. In other embodiments, based on a determination that the set-wide replication capacity and the store-specific replication capacity may be sufficient to perform the update on the second data set, as indicated at 770, a request may be sent to the identified data store to perform the update to the second data set. In at least one embodiment, a confirmation or rejection response may be returned from the identified data store, where the confirmation may be returned when the identified data store performs the update, and the rejection may be returned when the identified data store fails to perform the update.

Figure 8:
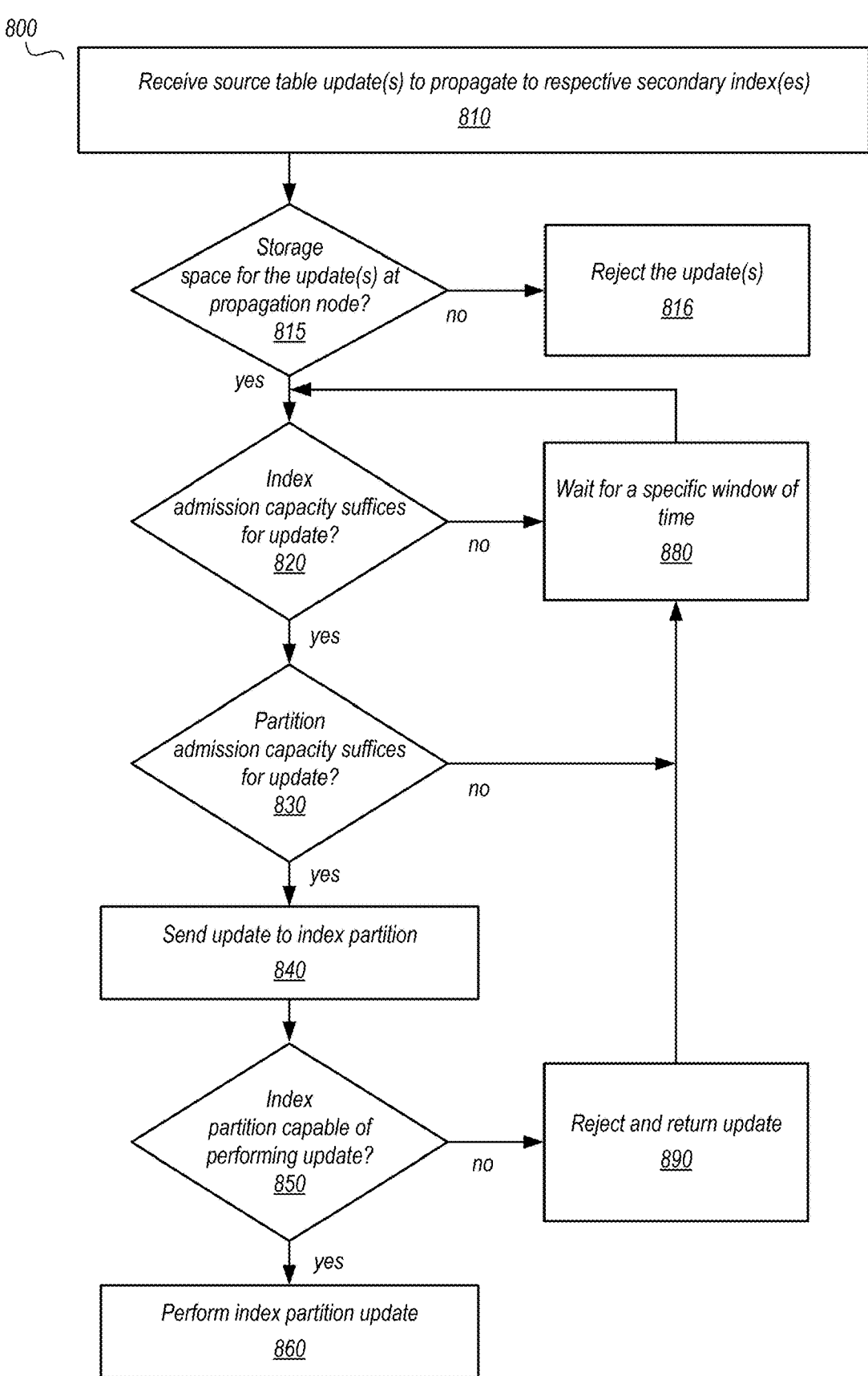
FIG. 8 is a high-level flow chart illustrating various methods and techniques to implement capacity-based replication management for propagating source table updates to respective secondary indexes, according to some embodiments.

FIG. 8 is a high-level flow chart illustrating various exemplary methods and techniques to implement propagating source table updates to respective secondary indexes, according to some embodiments. As indicated at 810, source table updates may be received to be propagated to respective secondary index(es), in some embodiments. For example, one or various source table updates may be received and performed on a source table (e.g., a source table of a database system, such as database system 210 of FIG. 2, etc.), where the one or various updates may modify, insert, or delete items stored in the source table. Based on the one or various updates performed on the source table, one or various updates may be required to be propagated to secondary indexes (e.g., updates may require to be propagated to secondary indexes when items associated with the secondary indexes are updated on the source table, etc.).

In at least one embodiment, the techniques illustrated in FIG. 8 may be performed by a propagation node (e.g., as depicted in FIG. 6). In such embodiments, a check on local storage at the propagation node to hold, buffer, or otherwise store the received update(s) may be made to determine whether there is storage space for the update(s), as indicated at 815. For example, if storage buffer(s), such as storage buffers 326A in FIG. 3, are full, then there may not be storage space for the update(s). If not, then as indicated at 816, the update(s) may be rejected. A response or other acknowledgment indicating the rejection of the received updates may be sent. A storage node (or nodes) of the source table for the secondary index may try again after a period of time, in some embodiments.

According to some embodiments, as indicated at 820, a determination if index admission capacity suffices for the update(s) may be made. The index admission capacity may be an admission capacity shared by the secondary index, according to some embodiments. As indicated by negative exist arrow from 820, based on a determination that the index admission capacity may not suffice for the update(s), as indicated at 880, a wait for a specific window of time may be implemented prior to retrying performing the update(s) to the secondary index. As indicated by positive exist arrow from 820, based on a determination that the index admission capacity suffices for the update(s), as indicated at 830, a determination if admission capacity suffices for the update, may be made. As indicated by negative exist arrow from 830, based on a determination that the admission capacity does not suffice for the update, as indicated by 880, a wait for a specific window of time may be implemented prior to retrying to perform the update(s) to the secondary index.

As indicated by positive exist arrow from 830, based on a determination that the partition admission capacity suffices for the update, as indicated at 840, the update(s) to perform may be sent to the index partition. The index partition may be an index partition identified by the received source update(s) to propagate to the respective secondary index(es) (e.g., similar to identifying a data store of the second data stores to replicate the one update to the second data set 730 of FIG. 7, etc.). The index partition may receive the update and attempt to perform the update. As indicated by negative exist arrow from 850, based on a determination that the index partition may not be capable of performing the update (e.g., index partition may be overwhelmed, etc.), as indicated at 890, the update may be rejected and returned, where, as indicated at 880, a wait for a specific window of time may be implemented prior to re-trying to perform the update on the secondary index. As indicated by positive exist arrow from 850, based on a determination that the index partition is capable of performing the update, as indicated at 860, the index partition may perform the index partition update. In at least one embodiment, the index partition may return a confirmation message indicating that the index partition successfully updated the secondary index.

The methods described herein may in various embodiments be implemented by any combination of hardware and software. For example, in some embodiments, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
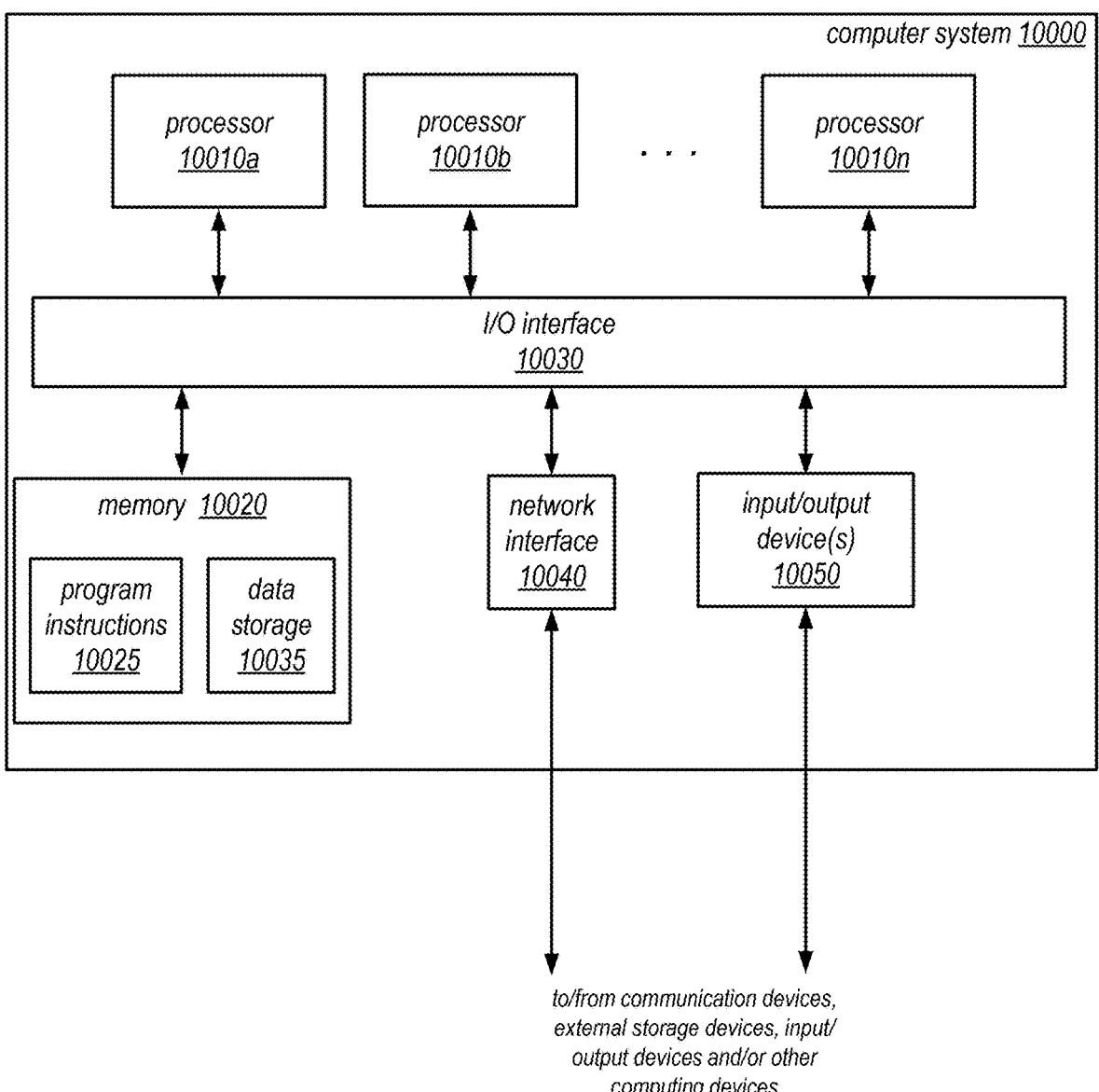
FIG. 9 is a block diagram illustrating an example computing system, according to some embodiments.

Embodiments to implement verifying performance of different replication techniques for data set projections offline builds for projected data subsets as described herein may be executed on one or more computer systems, which may interact with various other devices. One such computer system is illustrated by FIG. 9. In different embodiments, computer system 10000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 10000 includes one or more processors 10010 coupled to a system memory 1020 via an input/output (I/O) interface 10030. Computer system 10000 further includes a network interface 10040 coupled to I/O interface 10030, and one or more input/output devices 10050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 10000, while in other embodiments multiple such systems, or multiple nodes making up computer system 10000, may host different portions or instances of embodiments. For example, in some embodiments some elements may be implemented via one or more nodes of computer system 10000 that are distinct from those nodes implementing other elements.

In various embodiments, computer system 10000 may be a uniprocessor system including one processor 10010, or a multiprocessor system including several processors 10010 (e.g., two, four, eight, or another suitable number). Processors 10010 may be any suitable processor capable of executing instructions, in some embodiments. For example, in various embodiments, processors 10010 may be general-purpose or embedded processors implementing any of a variety of instruction set architectures (ISAs), such as the x86, PowerPC, SPARC, or MIPS ISAs, or any other suitable ISA. In multiprocessor systems, each of processors 10010 may commonly, but not necessarily, implement the same ISA.

In some embodiments, at least one processor 10010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 10025 and/or data accessible by processor 10010 to implement associating a function with a table in a database system, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1020 as program instructions 10025 and data storage 10035, respectively. In other embodiments, program instructions and/or data may be received, sent or stored upon different types of computer-accessible media or on similar media separate from system memory 1020 or computer system 10000. A computer-accessible medium may include non-transitory storage media or memory media such as magnetic or optical media, e.g., disk or CD/DVD-ROM coupled to computer system 10000 via I/O interface 10030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 10040, in some embodiments.

In some embodiments, I/O interface 10030 may be coordinate I/O traffic between processor 10010, system memory 1020, and any peripheral devices in the device, including network interface 10040 or other peripheral interfaces, such as input/output devices 10050. In some embodiments, I/O interface 10030 may perform any necessary protocol, timing or other data transformations to convert data signals from one component (e.g., system memory 1020) into a format suitable for use by another component (e.g., processor 10010). In some embodiments, I/O interface 10030 may include support for devices attached through various types of peripheral buses, such as a variant of the Peripheral Component Interconnect (PCI) bus standard or the Universal Serial Bus (USB) standard, for example. In some embodiments, the function of I/O interface 10030 may be split into two or more separate components, such as a north bridge and a south bridge, for example. In addition, in some embodiments some or all of the functionality of I/O interface 10030, such as an interface to system memory 1020, may be incorporated directly into processor 10010.

Network interface 10040 may allow data to be exchanged between computer system 10000 and other devices attached to a network, such as other computer systems, or between nodes of computer system 10000, in some embodiments. In various embodiments, network interface 10040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 10050 may, in some embodiments, include one or more display terminals, keyboards, keypads, touchpads, scanning devices, voice or optical recognition devices, or any other devices suitable for entering or retrieving data by one or more computer system 10000, in some embodiments. Multiple input/output devices 10050 may be present in computer system 10000 or may be distributed on various nodes of computer system 10000, in some embodiments. In some embodiments, similar input/output devices may be separate from computer system 10000 and may interact with one or more nodes of computer system 10000 through a wired or wireless connection, such as over network interface 10040.

As shown in FIG. 9, memory 1020 may include program instructions 10025, that implement the various embodiments of the systems as described herein, and data store 10035, including various data accessible by program instructions 10025, in some embodiments. In some embodiments, program instructions 10025 may include software elements of embodiments as described herein and as illustrated in the Figures. Data storage 10035 may include data that may be used in embodiments. In other embodiments, other or different software elements and data may be included.

Those skilled in the art will appreciate that computer system 10000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 10000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 10000 may be transmitted to computer system 10000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD- ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to implement a database system, the database system is configured to:
perform one or more updates received for a table, wherein the table is stored according to a first schema across a first plurality of storage nodes;
determine one or more index updates for a secondary index for the table, wherein the secondary index is stored according to a second schema, different from the first schema, across a second plurality of storage nodes;
identify a storage node of the second plurality of storage nodes to perform the one or more index updates according to the second schema;
obtain, for the secondary index:
an index-wide replication capacity for replicating to the secondary index across the second plurality of storage nodes; and
a node-specific replication capacity for replicating to the identified storage node; and
determine that there is sufficient capacity to perform the index update according to both the index-wide replication capacity and the node-specific replication capacity; and
cause the identified storage node to perform the index update to the secondary index.

2. The system of claim 1, wherein prior to the determination that there is sufficient capacity to perform the index update, the database system is further configured to determine that there is not sufficient capacity to perform the index update according to either a prior index-wide replication capacity and a prior node-specific replication capacity and delay performing the update for a period of time before attempting again.

3. The system of claim 2, wherein the identified storage node determines that there is not sufficient capacity of the identified storage node to perform the index update, and wherein the identified storage node is configured to:
reject the index update to the secondary index; and
return an indication of rejection of the index update to the database system.

4. The system of claim 3, wherein in response to receiving a rejection indication from the identified storage node, the database system is configured to:
analyze the received indication of rejection to determine the identified storage node rejected the index update;

based on determining the identified storage node rejected the index update, wait for a specific window of time; and attempt again to perform the index update, comprising:

obtain a further index-wide replication capacity and a further node-specific replication capacity, for the identified storage node;

determine that there is sufficient capacity to perform the index update according to the further index-wide replication capacity and the further node-specific replication capacity; and cause the identified storage node to perform the index update to the secondary index.

5. The system of claim 4, wherein the database system comprises a non-relational database service.

6. The system of claim 1, wherein causing the identified storage node to perform the index update to the secondary index, comprises of:

determine, by the identified storage node, that there is sufficient capacity of the identified storage node to perform the index update;

perform, by the identified storage node, the index update to the secondary index; and return, by the identified storage node, an indication of confirmation of the index update performed to the secondary index to the database system.

7. A method, comprising:

for one or more updates to a first data set distributed across a first plurality of data stores, replicating at least one of the updates to a second data set, wherein the second data set is a distributed across a second plurality of data stores, wherein the distribution of the second data set across the second plurality of data stores is different than the distribution of the first data set across the first plurality of data stores, and wherein the replicating comprises:

identifying a data store of the second plurality of data stores to replicate the at least one update to the second data set;

determining that replication to the identified data store can proceed based, at least in part, on a determination that:

a set-wide replication capacity for replicating across the second plurality of data stores of the second data set is sufficient to perform replication; and a store-specific replication capacity for replicating to the identified data store is sufficient to perform replication; and sending a request to the identified data store to perform the update to the second data set.

8. The method of claim 7, further comprising:

wherein prior to determining that the replication to the identified data store can proceed:

determining that a prior set-wide replication capacity or a prior store-specific replication capacity are not sufficient to perform the replication:

delaying the replication of the at least one update for a period of time before re-attempting to perform the at least one update.

9. The method of claim 7, further comprising:

receiving, by the identified data store, the request to update the second data set; and wherein performing the request to update the second data set, by the identified data store, comprises:

determining, by the identified data store, that there is sufficient capacity of the identified data store to perform the at least one update;

perform, by the identified data store, the at least one update to the second data set; and return, by the identified data store, an indication of confirmation of updating the second data set.

10. The method of claim 9, further comprising:

wherein the one or more updates are maintained in a buffer; and wherein in response to receiving the indication of confirmation of the update to the second data set from the identified data store, removing the at least one update from the buffer.

11. The method of claim 7, further comprising:

receiving, by the identified data store, the request to update the second data set; and wherein performing the request to update the second data set, by the identified data store, comprises:

determining, by the identified data store, that there is not sufficient capacity of the identified data store to perform the at least one update; and returning an indication of rejection.

12. The method of claim 11, wherein in response to receiving the indication of rejection of updating the second data set, from the identified data store, the method comprising:

waiting for a period of time; and attempting again to replicate the at least one update to the identified data store, comprising:

determining that a further set-wide replication capacity and a further store-specific replication capacity suffice to perform the replication; and sending the request to the identified data store to perform the update to the second data set.

13. The method of claim 7, wherein replicating the at least one of the updates to the second data set comprises selecting the at least one update from the one or more updates based, at least in part, on respective arrival times for the one or more updates.

14. One or more non-transitory, computer-readable storage media, storing program instructions that when executed on or across one or more computing devices cause the one or more computing devices to implement:

for one or more updates to a first data set distributed across a first plurality of data stores, replicating at least one of the updates to a second data set, wherein the second data set is distributed across a second plurality of data stores, wherein the distribution of the second data set across the second plurality of data stores is different than the distribution of the first data set across the first plurality of data stores, and wherein the replicating comprises:

identifying a data store of the second plurality of data stores to replicate the at least one update to the second data set;

determining that replication to the identified data store can proceed based at least in part, on a determination that:

a set-wide replication capacity for replicating across the second plurality of data stores of the second data set is sufficient to perform replication; and a store-specific replication capacity for replicating to the identified data store is sufficient to perform replication; and sending a request to the identified data store to perform the update to the second data set.

15. The one or more non-transitory, computer-readable storage media of claim 14, storing further program instructions that when executed on or across the one or more computing devices, cause the one or more computing devices to further implement:

prior to determining that the replication to the identified data store can proceed:

determining that a prior set-wide replication capacity or a prior store-specific replication capacity may not be sufficient to perform the replication; and delaying performing the replication for a period of time.

16. The one or more non-transitory, computer-readable storage media of claim 14, storing further program instructions that when executed on or across the one or more computing devices, further cause the one or more computing devices to implement:

receiving, from the identified data store, an indication of rejection of replicating the update to the second data set;

in response to receiving the indication of rejection, waiting for a period of time; and attempting again to replicate the update, wherein in attempting again to replicate the update, the program instructions cause the one or more computing devices to implement:

determining that replication to the identified data store can proceed; and sending the request to the identified data store to perform the update to the second data set.

17. The one or more non-transitory, computer-readable storage media of claim 14, storing further program instructions that when executed on or across the one or more computing devices, further cause the one or more computing devices to implement:

receiving, from the identified data store, an indication of acceptance of replicating the update to the second data set;

removing the at least one update to replicate; and proceeding to another update to replicate to the second data set based, at least in part, on further one or more updates to the first data set.

18. The one or more non-transitory, computer-readable storage media of claim 14, wherein the one or more computing devices implement capacity-based management for replicating updates to the second data set, and wherein the one or more non-transitory, computer-readable storage media store further program instructions that when executed on or across the one or more computing devices, cause the one or more computing devices to further implement:

receiving one or more further updates to the first data set to replicate to the second data set;

determining that a capacity of the set-wide replication capacity or the store-specific replication capacity is not sufficient to perform the one or more further updates; and rejecting the received one or more further updates.

19. The one or more non-transitory, computer-readable storage media of claim 14, wherein the set-wide replication capacity for replicating across the second plurality of data stores is obtained from the second plurality of data stores.

20. The one or more non-transitory, computer-readable storage media of claim 14, wherein the first data set is a database table hosted by a database service of a provider network, and wherein the second data set is a global secondary index hosted by the database service.

* * * * *